United States Patent
Amano et al.

(10) Patent No.: US 10,557,495 B2
(45) Date of Patent: Feb. 11, 2020

(54) CONNECTING ROD BEARING FOR CRANKSHAFT OF INTERNAL COMBUSTION ENGINE

(71) Applicant: DAIDO METAL COMPANY LTD., Nagoya (JP)

(72) Inventors: Seiji Amano, Inuyama (JP); Shinichi Sakurai, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 16/142,251

(22) Filed: Sep. 26, 2018

(65) Prior Publication Data

US 2019/0128318 A1 May 2, 2019

(30) Foreign Application Priority Data

Oct. 26, 2017 (JP) .................................. 2017-207240

(51) Int. Cl.
*F16C 9/04* (2006.01)
*F16C 33/04* (2006.01)
(Continued)

(52) U.S. Cl.
CPC .............. *F16C 9/04* (2013.01); *F16C 33/046* (2013.01); *F16C 33/1065* (2013.01); *F16C 17/022* (2013.01)

(58) Field of Classification Search
CPC .. F16C 9/02; F16C 9/04; F16C 17/022; F16C 33/046; F16C 33/1065
See application file for complete search history.

(56) References Cited

U.S. PATENT DOCUMENTS 2,965,419 A 12/1960 Lowe
4,105,267 A * 8/1978 Mori ................... F16C 33/1065
384/291
(Continued)

FOREIGN PATENT DOCUMENTS

JP H04-219521 A 8/1992
JP H05-202936 A 8/1993
(Continued)

OTHER PUBLICATIONS

Extended European Search Report issued in corresponding EP Application No. 18200703.9, dated Mar. 7, 2019, 8 pages.
(Continued)

*Primary Examiner* — James Pilkington
(74) *Attorney, Agent, or Firm* — Snyder, Clark, Lesch & Chung, LLP (57) ABSTRACT

A connecting rod bearing for a crankpin of a crankshaft of an internal combustion engine includes a pair of half bearings forming a cylindrical shape. Each half bearing has a main cylindrical portion including a circumferentially central portion of the half bearing, and crush reliefs formed on both circumferential sides of the main cylindrical portion with a wall thickness being smaller than that of the main cylindrical portion. At least one half bearing has an axial groove which extends in an axial direction on a slide surface of the main cylindrical portion, and is apart from the circumferentially central portion by a circumferential angle of 10° or more toward a forward side in a rotation direction of the crankpin, and apart from the crush relief by a circumferential angle of 10° or more toward the circumferentially central portion.

8 Claims, 8 Drawing Sheets

(51) Int. Cl.
    *F16C 33/10*     (2006.01)
    *F16C 17/02*     (2006.01)

(56)     References Cited

U.S. PATENT DOCUMENTS

| | | | |
|---|---|---|---|
| 8,708,566 B2* | 4/2014 | Otsuki | F16C 9/02 |
| | | | 384/288 |
| 9,341,211 B2* | 5/2016 | Aubele | F16C 9/04 |
| 2013/0064487 A1 | 3/2013 | Ishigo | |

FOREIGN PATENT DOCUMENTS

| | | |
|---|---|---|
| JP | H08-277831 A | 10/1996 |
| JP | H09-504356 A | 4/1997 |

OTHER PUBLICATIONS

Office Action issued in corresponding Korean Application No. 10-2018-0127236, dated Jun. 20, 2019, 6 pages.

\* cited by examiner

CONNECTING ROD BEARING FOR CRANKSHAFT OF INTERNAL COMBUSTION ENGINE

BACKGROUND OF THE INVENTION

(1) Field of the Invention

The present invention relates to a connecting rod bearing, and particularly to a connecting rod bearing for a crankshaft of an internal combustion engine configured so that lubricating oil supplied to an inner peripheral surface of a main bearing which bears the crankshaft is supplied to an inner peripheral surface of the connecting rod bearing which bears a crankpin, through an internal lubricating oil path of the crankshaft.

(2) Description of Related Art

A crankshaft of an internal combustion engine is borne or supported at its journal portion by a main bearing composed of a pair of half bearings at a cylinder block bottom part of the internal combustion engine. For the main bearing, lubricating oil discharged by an oil pump is fed into a lubricating oil groove formed along an inner peripheral surface of the main bearing, from an oil gallery formed in a cylinder block wall through a through-hole formed in a wall of the main bearing. Further, a first lubricating oil path is formed to penetrate through the journal portion in a radial direction thereof, and openings at both ends of the first lubricating oil path communicate with the lubricating oil groove of the main bearing. Further, a second lubricating oil path passing through a crank arm portion is formed so as to branch from the first lubricating oil path of the journal portion, and the second lubricating oil path communicates with a third lubricating oil path which is formed to penetrate through the crankpin a radial direction thereof. In this way, the lubricating oil fed into the lubricating oil groove formed on the inner peripheral surface of the main bearing from the oil gallery in the cylinder block wall through the through-hole is supplied between slide surfaces of the crankpin and a connecting rod bearing, from a discharge opening which opens at the end of the third lubricating oil path, through the first lubricating oil path, the second lubricating oil path and the third lubricating oil path (e.g., see JP H08-277831 A).

Conventionally, a slide bearing composed of a pair of half bearings has been adopted as a main bearing and a connecting rod bearing. In the slide bearing, a so-called crush relief is formed adjacent to abutment surfaces of the half bearings.

A crush relief is a wall thickness reduced region in which a wall thickness of a region adjacent to a circumferential end surface of a half bearing is formed to decrease toward the circumferential end surface. The crush relief is formed with the intention of absorbing displacement and deformation of abutment surfaces of the half bearings in a state where a pair of half bearings are mounted (e.g., see JP H04-219521 A).

BRIEF SUMMARY OF THE INVENTION

In recent years, higher-speed rotation of a crankshaft has been required for an internal combustion engine in order to increase output. During operation by high-speed rotation of a crankshaft of an internal combustion engine, at the moment when a discharge opening of a lubricating oil path for oil on an outer peripheral surface of a cylindrical barrel portion of a crankpin starts to communicate with a crush relief after a state where the discharge opening is blocked by a slide surface of a half bearing for a connecting rod bearing, high-pressure oil in an internal lubricating oil path of the crankpin is jetted from the discharge opening to a clearance between the crush relief of the half bearing and the surface of the crankpin, turbulent flow is thereby generated, and a frictional loss is caused.

Specifically, a connecting rod bearing bears a dynamic load from a crankpin of a crankshaft by the generation of pressure in oil between a slide surface of the connecting rod bearing and the surface of the crankpin.

During the operation of an internal combustion engine, the degree of a load on the slide surface of the connecting rod bearing and the direction of the load constantly fluctuate, and a central axis of the crankpin moves while decentering relative to a bearing central axis of the connecting rod bearing in such a manner as to generate oil film pressure which balances with the load. Thus, the connecting rod bearing has a constantly changing bearing clearance (clearance between the surface of the crankpin and the slide surface) at any position of the slide surface.

Figure 13:
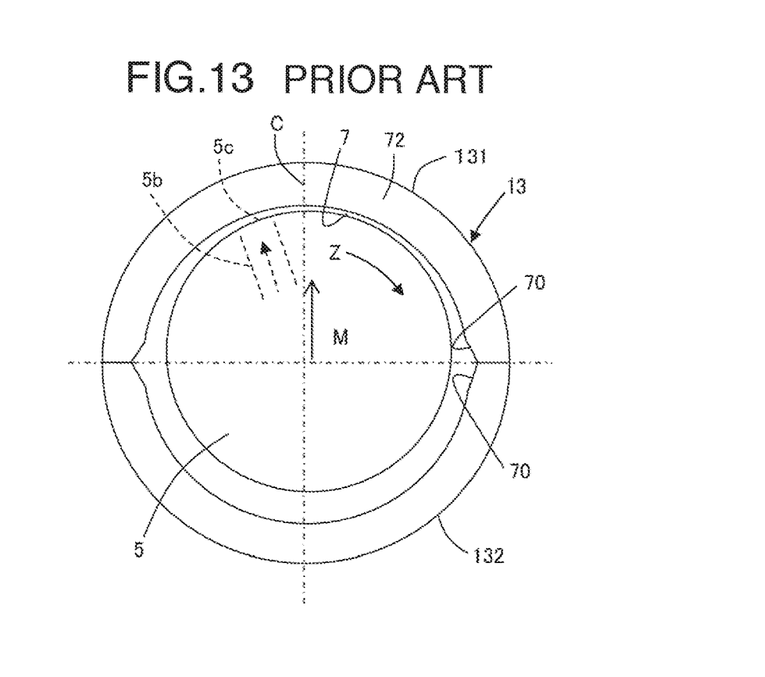
FIG. 13 is a view for illustrating an action of a connecting rod bearing according to a prior art.

In a four-cycle internal combustion engine, a load on a connecting rod bearing is maximized in a combustion stroke. At this point, as shown in FIG. 13, in a connecting rod bearing 13 composed of half bearings 131 and 132, a crankpin 5 moves in a direction (arrow M) toward a slide surface 7 in the vicinity of a circumferentially central portion C of the half bearing 131 located on the upper side of the drawing, and the surface of the crankpin 5 comes closest to the slide surface 7 in the vicinity of the circumferentially central portion C of the upper half bearing 131. Consequently, oil in a clearance (bearing clearance) between the slide surface 7 in the vicinity of the circumferentially central portion C of the half bearing 131 and the surface of the crankpin 5 becomes extremely high in pressure under load.

Figure 1:
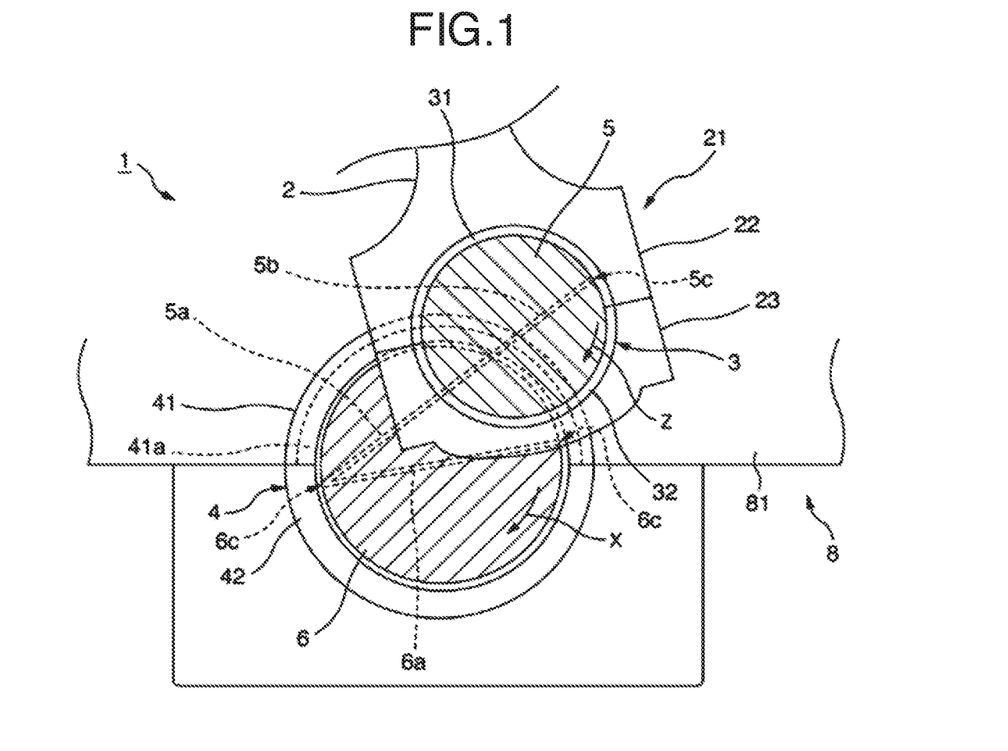
FIG. 1 is a sectional view in which a crankshaft of an internal combustion engine is cut at a journal portion and a crankpin portion.

It should be noted that the half bearing 131 on the upper side of the drawing shown in FIG. 13 is a half bearing to be combined with a rod-side large end housing 22 of a connecting rod 2 shown in FIG. 1.

Figure 14:
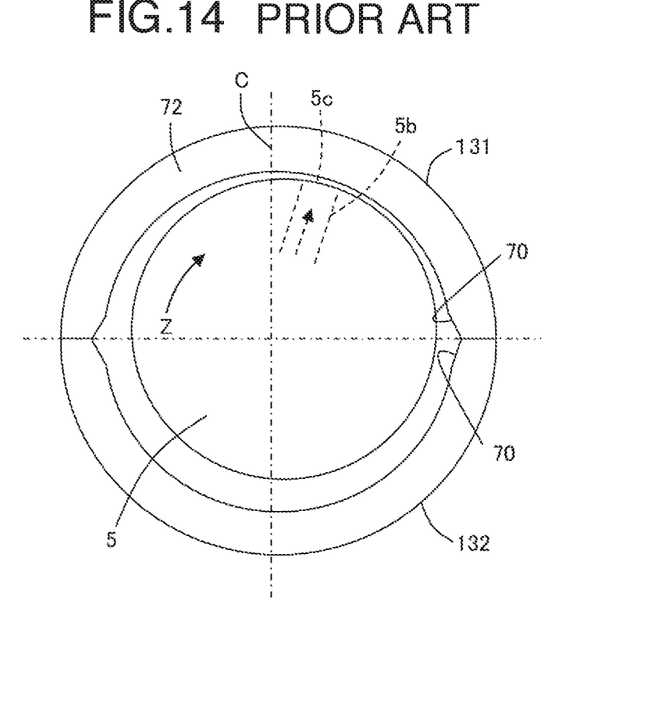
FIG. 14 is a view for illustrating an action of the connecting rod bearing according to the prior art.

As shown in FIG. 14, during the rotation of the crankpin 5 in a Z-direction, a clearance between the surface of the crankpin 5 and the slide surface 7 of a main cylindrical portion 72 of the half bearing 131 is narrow while a discharge opening 5c for oil on an outer peripheral surface is located above the slide surface 7 of the main cylindrical portion 72 of the half bearing 131. Therefore, the amount of oil flowing out from the discharge opening 5c is small, and the pressure of oil in a lubricating oil path 5b is in a high state. Particularly during operation with high-speed rotation of a crankshaft of an internal combustion engine, an effect of centrifugal force on the oil in the lubricating oil path 5b increases, and the pressure of oil near the discharge opening 5c in the lubricating oil path 5b rises.

Figure 15:
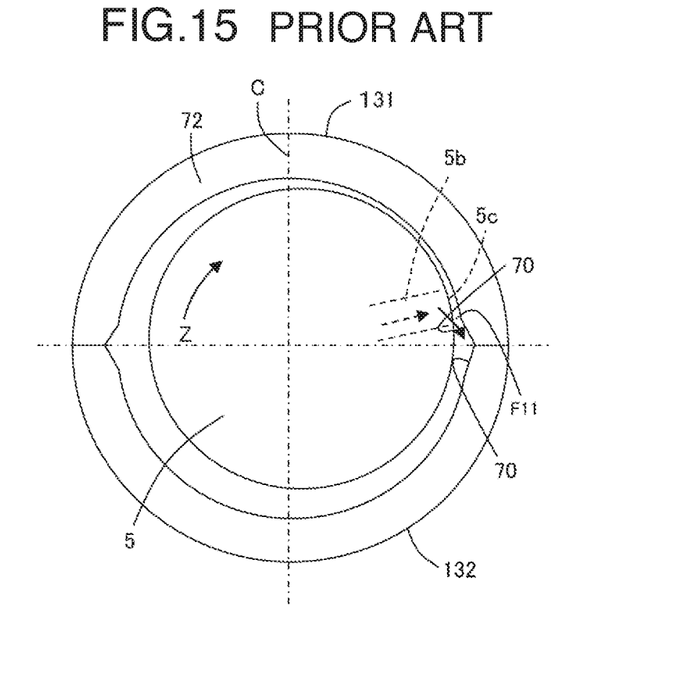
FIG. 15 is a view for illustrating an action of the connecting rod bearing according to the prior art.
Figure 16:
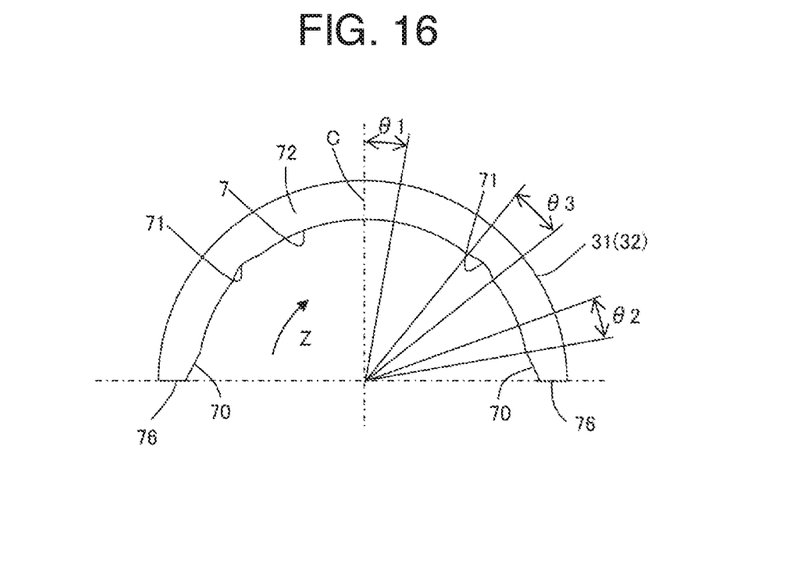
FIG. 16 is a view in which a half bearing of a connecting rod bearing according to another embodiment of the present invention is seen from an axial direction.
Figure 17:
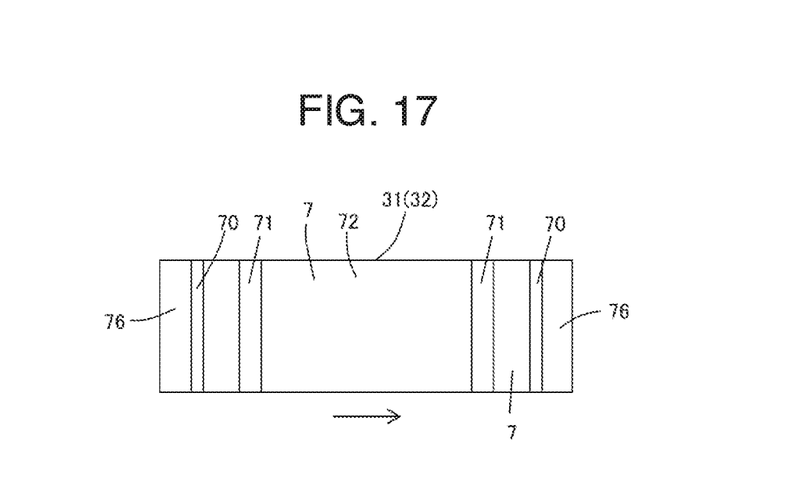
FIG. 17 is a plan view in which the half bearing shown in FIG. 16 is seen from a slide surface side.
Figure 18:
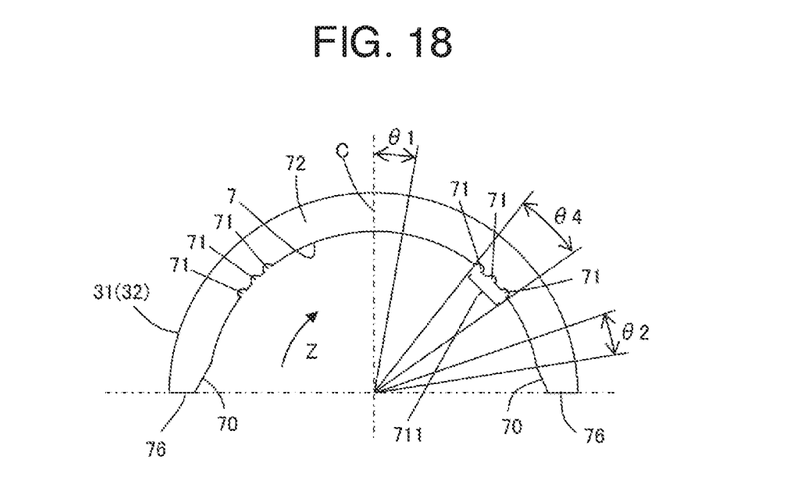
FIG. 18 is a view in which a half bearing of a connecting rod bearing according to another embodiment of the present invention is seen from an axial direction.
Figure 19:
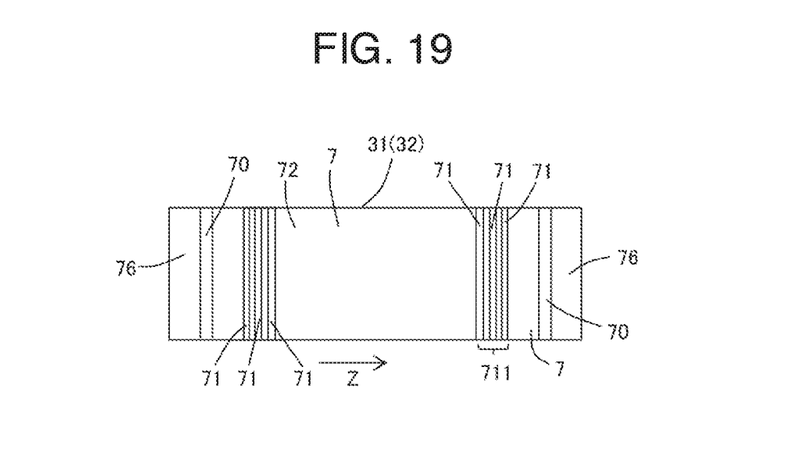
FIG. 19 is a plan view in which the half bearing shown in FIG. 18 is seen from a slide surface side.

As shown in FIG. 15, at the moment when communication between the discharge opening 5c of the lubricating oil path 5b on the surface of the crankpin 5 and a crush relief 70 is started, jet flow (F11) is instantaneously formed from the lubricating oil path 5b toward a relief clearance due to the difference in pressure between the oil in the lubricating oil path 5b and the oil in the clearance (relief clearance) between the crush relief 70 and the surface of the crankpin 5, and turbulent flow is generated. The generation of such turbulent flow causes the frictional loss described above.

Therefore, an object of the present invention is to provide a connecting rod bearing for a crankshaft of an internal combustion engine that enables a frictional loss resulting from the above-described jet flow to be reduced during the operation of the internal combustion engine.

According to the present invention, there is provided a connecting rod bearing which rotatably supports a crankpin of a crankshaft of an internal combustion engine, the crankpin including a cylindrical barrel portion, a lubricating oil path extending through the cylindrical barrel portion, and at least one discharge opening of the lubricating oil path formed on an outer peripheral surface of the cylindrical barrel portion, wherein the connecting rod bearing including a pair of half bearings which are combined with each other to form a cylindrical shape, each of the half bearings has a main cylindrical portion including a circumferentially central portion (circumferentially central section) of the half bearing, the main cylindrical portion has a slide surface on a radially inner side thereof, and each of the half bearings also has crush reliefs formed on both circumferential sides of the slide surface so that a wall thickness at the crush relief is smaller than that of the main cylindrical portion, at least one of the pair of half bearings has an axial groove extending in an axial direction on the slide surface between the circumferentially central portion of the half bearing and the crush relief located on a forward side in a rotation direction of the crankpin, and the axial groove is apart from the circumferentially central portion of the half bearing by a circumferential angle of 10° or more toward the forward side in the rotation direction, and apart from the crush relief located on the forward side in the rotation direction of the crankpin by a circumferential angle of 10° or more.

According to the present invention, a depth (D1) of the axial groove measured from the slide surface in a radial direction may be 0.5 to 30 μm.

Furthermore, the axial groove may have a circumferential length corresponding to a circumferential angle of 1 to 35°.

Moreover, the axial groove may open at both axial ends of the half bearing.

Alternatively, the axial groove may not open at either axial end of the half bearing.

Furthermore, according to the present invention, the connecting rod bearing may include a plurality of axial grooves, and in that case the plurality of axial grooves may be formed within a circumferential range of a circumferential angle of 5 to 35°.

Moreover, the above described at least one half bearing may also have a further axial groove formed on the slide surface between the circumferentially central portion and the crush relief located on a backward side in the rotation direction of the crankpin so as to be symmetrical to the above described axial groove with respect to the circumferentially central portion.

DETAILED DESCRIPTION OF THE INVENTION

Hereinafter, embodiments of the present invention will be described with reference to the drawings. It should be noted that an axial groove and a crush relief are drawn in an exaggerated manner in the drawings to make it easier to understand.

Embodiment 1

(Overall Configuration of Bearing Device)

As shown in FIG. 1, a bearing device 1 according to the present embodiment includes a journal portion 6 borne at a bottom part of a cylinder block 8, a crankpin 5 which is formed integrally with the journal portion 6 and thus rotates around the journal portion 6, and a connecting rod 2 which transmits reciprocating movement to the crankpin 5 from an internal combustion engine. As slide bearings which bear a crankshaft, the bearing device 1 further includes a main bearing 4 which rotatably bears the journal portion 6, and a connecting rod bearing 3 which rotatably bears the crankpin 5.

It should be noted that the crankshaft includes a plurality of journal portions 6 and a plurality of crankpins 5, however, for convenience of explanation, one journal portion 6 and one crankpin 5 are shown in the drawings and will be described accordingly. In FIG. 1, regarding a positional relation in the depth direction of the drawing, the journal portion 6 exits on a far side of the drawing, and the crankpin 5 exists on a near side.

The journal portion 6 is supported at a cylinder block bottom part 81 of the internal combustion engine via the main bearing 4 composed of a pair of half bearings 41 and 42. A lubricating oil groove 41a is formed in the half bearing 41 on an upper side in FIG. 1 over the entire length of its inner peripheral surface. Moreover, the journal portion 6 has a lubricating oil groove 6a penetrating therethrough in a radial direction. If the journal portion 6 rotates in an arrow X direction, both end openings 6c of the lubricating oil groove 6a alternately communicate with the lubricating oil groove 41a of the main bearing 4.

The crankpin 5 is supported at a large end housing 21 (a rod side large end housing 22 and a cap side large end housing 23) of the connecting rod 2 via the connecting rod bearing 3 composed of a pair of half bearings 31 and 32.

As described above, lubricating oil discharged to the main bearing 4 by an oil pump is fed into the lubricating oil groove 41a formed along the inner peripheral surface of the main bearing 4, from an oil gallery formed in a cylinder block wall through a through-hole formed in a wall of the main bearing 4.

Furthermore, the first lubricating oil groove 6a is formed to penetrate through the journal portion 6 in the radial direction, and both end openings of the first lubricating oil groove 6a communicate with the lubricating oil groove 41a. Further, a second lubricating oil path 5a passing through a crank arm portion (not shown) is formed so as to branch from the first lubricating oil groove 6a of the journal portion 6, and the second lubricating oil path 5a communicates with a third lubricating oil path 5b formed to penetrate through the crankpin 5 in a radial direction thereof.

In this way, the lubricating oil is supplied into a clearance formed between the crankpin 5 and the connecting rod bearing 3 from the discharge opening 5c located at the end of the third lubricating oil path 5b through the first lubricating oil groove 6a, the second lubricating oil path 5a, and the third lubricating oil path 5b.

(Configuration of Connecting Rod Bearing)

Figure 4:
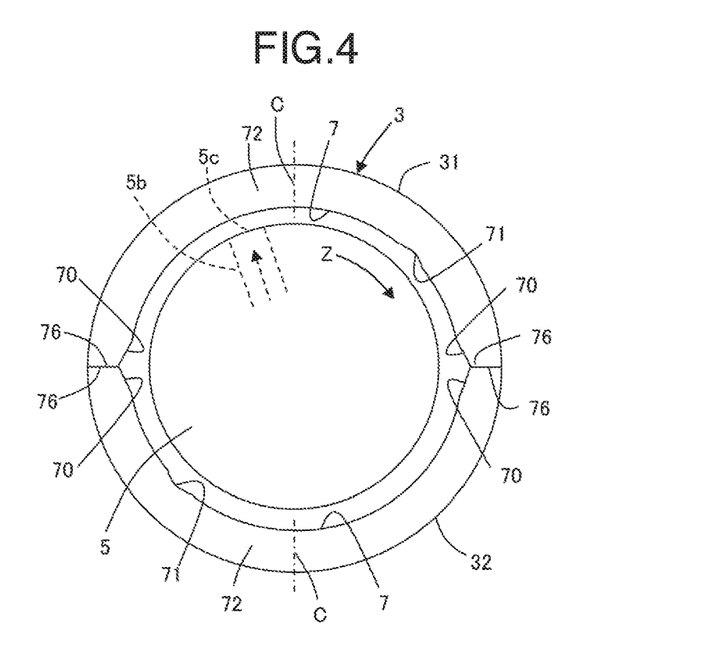
FIG. 4 is a view in which the connecting rod bearing and the crankpin portion according to the first embodiment of the present invention are seen from the axial direction.

The connecting rod bearing 3 according to the present embodiment is formed by bringing circumferential end surfaces 76 of the pair of half bearings 31 and 32 into abutment with each other and thus combining the pair of half bearings 31 and 32 into a cylindrical shape as a whole (see FIG. 4). The half bearing 31 or 32 has a slide layer including a Cu bearing alloy or an Al bearing alloy, or has a back metal layer made of an Fe alloy, and a slide layer including a Cu bearing alloy or an Al bearing alloy. In addition, the slide layer may have, on a surface side (including an inner surface of an axial groove 71) serving as the slide surface 7, a surface portion consisting of any one selected from the group consisting of Bi, Sn, and Pb softer than a bearing alloy, a surface portion consisting of an alloy mainly containing the above metals, or a surface portion consisting of a resin composition mainly containing synthetic resin. However, it is preferable that the inner surface of the axial groove 71 does not have these surface portions. This is because, when the oil contains a large amount of foreign matters, the foreign matters tend to be embedded or accumulated in the soft surface portion serving as the inner surface of the axial groove 71. If the foreign matters are embedded or accumulated in the inner surface of the axial groove 71, turbulent flow tends to be generated in the oil flowing in the axial groove 71.

The half bearing 31 or 32 has the main cylindrical portion 72 including a circumferentially central portion C, and the slide surface 7 is formed on a radially inner side of the main cylindrical portion 72. Moreover, crush reliefs 70, 70 are formed on both circumferential sides of the slide surface 7.

Figure 2:
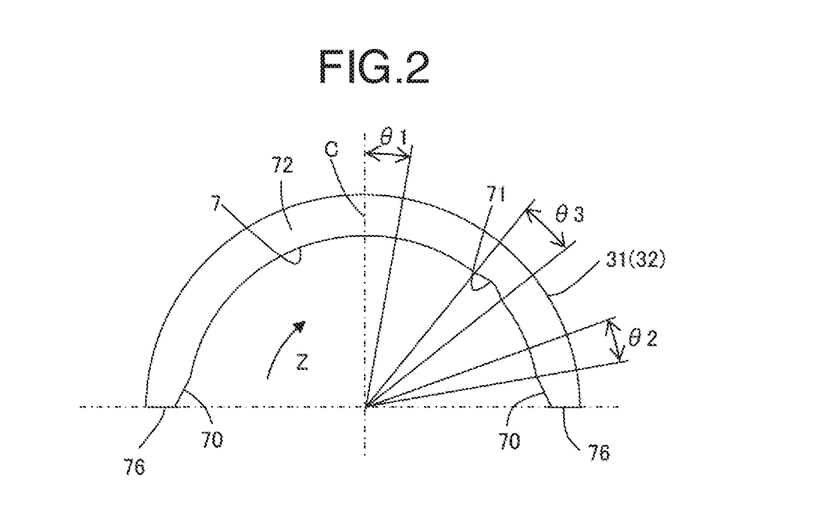
FIG. 2 is a view in which a half bearing of a connecting rod bearing according to a first embodiment of the present invention is seen from an axial direction.
Figure 3:
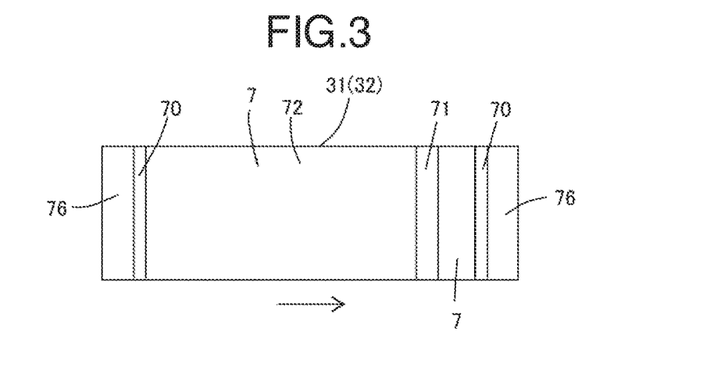
FIG. 3 is a plan view in which the half bearing shown in FIG. 2 is seen from a slide surface side.

As shown in FIGS. 2 to 4, the crush relief 70 refers to a surface formed by reducing the wall thickness of the half bearing 31 or 32 from the original slide surface 7 in a radial direction in a circumferential end region of the half bearing 31 or 32. This surface is formed to absorb, for example, displacement and deformation of the circumferential end surface 76 of the half bearing 31 or 32 that may be caused when the pair of half bearings 31 and 32 is mounted in the connecting rod 21. Therefore, a curvature center position of the surface of the crush relief 70 is different from a curvature center position of another region (the slide surface 7) (see SAE J506 (item 3.26 and item 6.4), DIN1497, section 3.2, and JIS D3102). In general, in the case of a bearing for a small-size internal combustion engine for a passenger vehicle, the depth of the crush relief 70 in the circumferential end surface 76 of the half bearing (a distance from the original slide surface 7 to the crush relief 70 in the circumferential end surface 76) is approximately 0.01 to 0.05 mm.

It should be noted that the bearing wall thickness (bearing wall thickness excluding the region where the crush relief 70 is formed, i.e., wall thickness of the main cylindrical portion 72) of the half bearing 31 or 32 is constant in a circumferential direction. However, without being limited thereto, the bearing wall thickness of the half bearing 31 or 32 may be maximized in the circumferentially central portion C, and continuously decrease toward both circumferential end surfaces 76.

The half bearing 31 or 32 has the axial groove 71 on the slide surface 7 of the main cylindrical portion 72 between the circumferentially central portion C of the half bearing and the crush relief 70 on a forward side in a rotation direction Z of the crankpin 5.

In the present embodiment, the axial groove 71 is formed on the slide surface 7 only in a region apart from the circumferentially central portion C of the half bearing 31 or 32 by a circumferential angle ($\theta 1$) of 10° or more, and apart from the crush relief 70 on the forward side in the rotation direction Z of the crankpin toward the circumferentially central portion by a circumferential angle ($\theta 2$) of 10° or more. Further, the axial groove 71 is apart from the circumferentially central portion C of the half bearing 31 or 32 preferably by a circumferential angle ($\theta 1$) of 150 or more. Moreover, the axial groove 71 is apart from the crush relief 70 on the forward side in the rotation direction Z of the crankpin of the half bearing 31 or 32 toward the circumferentially central portion preferably by a circumferential angle ($\theta 2$) of 150 or more.

Incidentally, the crankpin 5 of the crankshaft of the internal combustion engine rotates in one direction during operation. Thus, a person skilled in the art will be able to appreciate which of the two crush reliefs 70, 70 adjacent to both circumferential end surfaces 76, 76 of the half bearing 31 or 32 is the "crush relief on the forward side in the rotation direction of the crankpin", in consideration of the rotation direction of the crankpin 5 of the crankshaft. Moreover, a person skilled in the art is able to design and manufacture the connecting rod bearing 3 according to the present embodiment under the disclosure of the present invention, and suitably mount the connecting rod bearing 3 on a connecting rod so as to bear the crankpin of the crankshaft which rotates in one direction.

Figure 5:
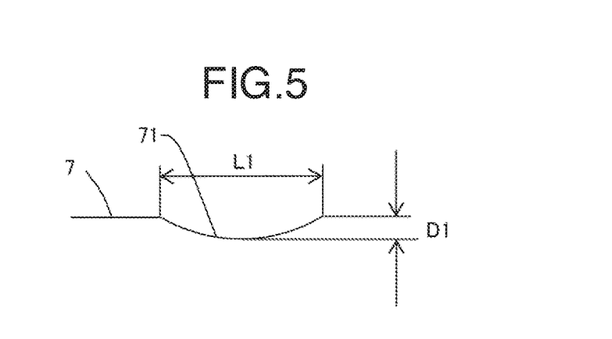
FIG. 5 is a sectional view of an axial groove formed on a slide surface of the half bearing.

FIG. 5 shows a section of the axial groove 71 perpendicular to the axial direction of the half bearing 31 or 32. The section of the axial groove 71 has an arc-shape. It should be noted that the sectional shape of the axial groove 71 can be changed to a sectional shape such as an inverted trapezoid.

A depth D1 of the axial groove 71 from the slide surface 7 in a radial direction may be 0.5 to 30 μm. The depth D1 of the axial groove 71 is preferably 20 μm or less, and still preferably 10 μm or less. Moreover, a circumferential length L1 of the axial groove 71 is preferably a length equivalent to a circumferential angle (θ3) of 1 to 35° on the slide surface 7 of the half bearing 31 or 32, and still preferably a length equivalent to a circumferential angle (θ3) of 1 to 20°.

In the present embodiment, the depth D1 and the circumferential length L1 of the axial groove 71 are constant along the axial direction of the half bearing 31 or 32, but the depth D1 and the circumferential length L1 may be changed along the axial direction.

In the present embodiment, the circumferential length L1 of the axial groove 71 is a length equivalent to a circumferential angle (θ3) of 10°, and the axial groove 71 is formed so that the center of the circumferential length L1 is located at a circumferential angle of 45° from the circumferentially central portion C of the half bearing 31 or 32 toward the forward side in the rotation direction Z of the crankpin 5.

Advantageous Effects

Figure 6:
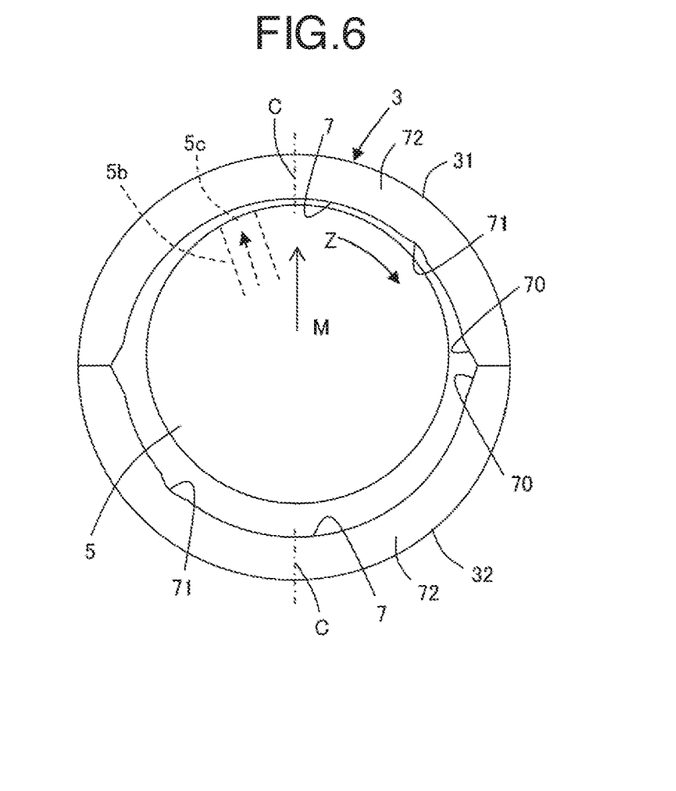
FIG. 6 is a view similar to FIG. 4, for illustrating an action of the connecting rod bearing according to the first embodiment of the present invention.

In a four-cycle internal combustion engine, a load on the connecting rod bearing 3 is maximized in a combustion stroke. At this point, in the connecting rod bearing 3, the crankpin 5 moves in a direction (arrow M) toward the slide surface 7 in the vicinity of the circumferentially central portion C of the half bearing 31 on the upper side of the drawing as shown in FIG. 6, and the surface of the crankpin 5 comes closest to the slide surface 7 in the vicinity of the circumferentially central portion C of the upper half bearing 31. Consequently, oil in a clearance (bearing clearance) between the slide surface 7 in the vicinity of the circumferentially central portion C of the half bearing 31 and the surface of the crankpin 5 becomes extremely high in pressure under the load.

As shown in FIG. 6, while the discharge opening 5c of the lubricating oil path 5b of the crankpin 5 is located on a backward side in the rotation direction Z of the crankpin 5 from the circumferentially central portion C of the upper half bearing 31, the clearance between the slide surface 7 of the half bearing 31 and the surface of the crankpin 5 is large. Therefore, the oil in the lubricating oil path 5b of the crankpin 5 flows out to the clearance, and the pressure of the oil in the lubricating oil path 5b does not become high.

(It should be noted that, in an exhaust stroke of the four-cycle internal combustion engine, the crankpin 5 shown in FIG. 1 moves in a direction toward the slide surface in the vicinity of the circumferentially central portion C of the half bearing 32 on the lower side of the drawing, and the surface of the crankpin 5 comes closest to the slide surface 7 in the vicinity of the circumferentially central portion C of the half bearing 32 on the lower side in the drawing. Consequently, the oil in the clearance (bearing clearance) between the slide surface 7 in the vicinity of the circumferentially central portion C of the half bearing 32 on the lower side of the drawing and the surface of the crankpin 5 becomes high in pressure.)

In a combustion stroke, the clearance between the surface of the crankpin 5 and the slide surface 7 is narrow while the discharge opening 5c of the lubricating oil path 5b on an outer peripheral surface of the crankpin 5 is located on the slide surface 7 of the main cylindrical portion 72 between the circumferentially central portion C and the axial groove 71 after passing the circumferentially central portion C of the upper half bearing 31. Therefore, the amount of oil flowing out from the discharge opening 5c is small. Particularly during operation of high-speed rotation of a crankshaft of an internal combustion engine, the pressure of oil near the discharge opening 5c in the lubricating oil path 5b increases due to the effect of centrifugal force on the oil inside the lubricating oil path 5b.

Figure 7:
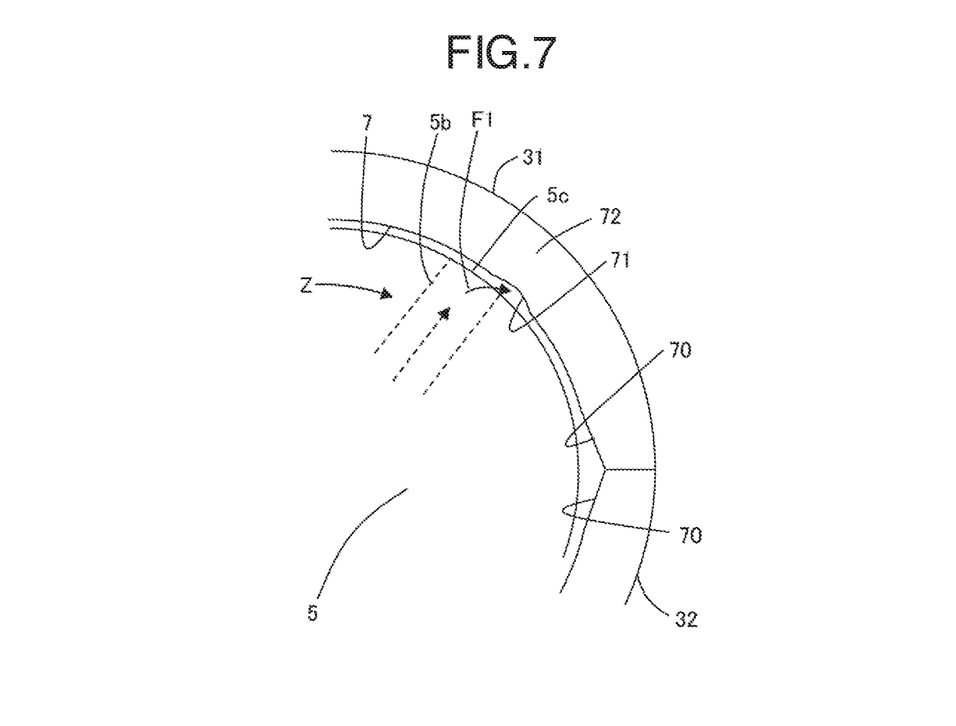
FIG. 7 is a partially enlarged view for illustrating an action of the connecting rod bearing according to the first embodiment of the present invention.

According to the present invention, at the moment when communication between the discharge opening 5c of the lubricating oil path 5b on the outer peripheral surface of the crankpin 5 and the axial groove 71 is then started as shown in FIG. 7, oil flow F1 from the lubricating oil path 5b into the axial groove 71 is formed by the difference in pressure between the oil in the lubricating oil path 5b and the oil in the clearance between an inner surface of the axial groove 71 and the surface of the crankpin 5. In this instance, the pressure of oil in the lubricating oil path 5b decreases.

Further, according to the present invention, the oil in the lubricating oil path 5b of the crankpin 5 does not become so high in pressure even under the effect of centrifugal force, because the discharge opening 5c of the lubricating oil path 5b of the crankpin 5 is blocked by the slide surface 7 only in a period after passing the circumferentially central portion C of the half bearing 31 until communicating with the axial groove 71.

Thus, the difference between the pressure of oil in the lubricating oil path 5b and the pressure of oil in the axial groove 71 does not become so large, and the oil flow F1 does not become too strong. Moreover, even if the oil flow F1 is formed, turbulent flow is not easily generated.

Figure 8:
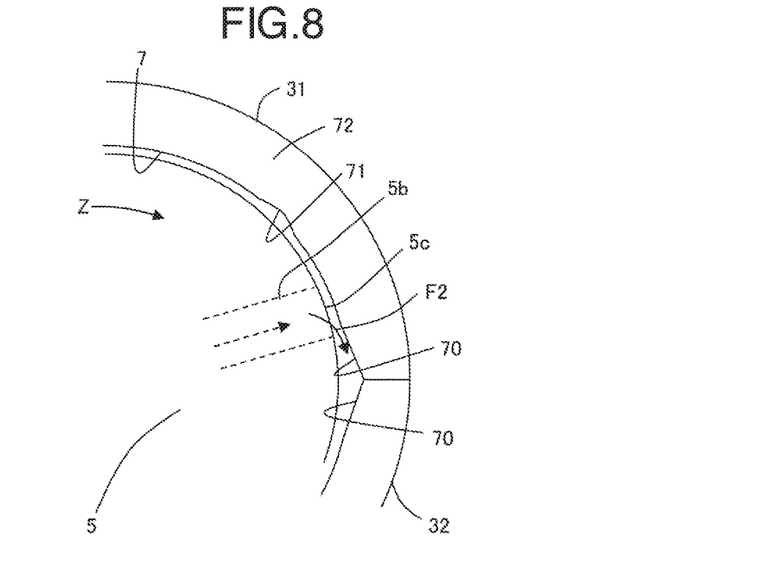
FIG. 8 is a partially enlarged view for illustrating an action of the connecting rod bearing according to the first embodiment of the present invention.

As shown in FIG. 8, at the moment when communication between the discharge opening 5c of the lubricating oil path 5b on the outer peripheral surface of the crankpin 5 and the crush relief 70 is started, oil flow F2 from the lubricating oil path 5b into the crush relief is formed by the difference between the pressure of oil in the lubricating oil path 5b and the pressure of oil in the clearance (relief clearance) between the crush relief 70 and the surface of the crankpin 5.

However, according to the present invention, the discharge opening 5c of the lubricating oil path 5b of the crankpin 5 and the crush relief 70 (relief clearance) communicate with each other after the pressure of the oil in the lubricating oil path 5b of the crankpin 5 is once reduced by the oil flow F1 into the axial groove 71 shown in FIG. 7. Moreover, increase in pressure due to the effect of centrifugal force is small because a period in which the discharge opening 5c ends communication with the axial groove 71 and then starts communication with the crush relief 70, that is, a period in which the discharge opening 5c is again blocked by the slide surface 7 is short.

Thus, the pressure difference between the oil in the lubricating oil path 5b and the oil in the relief clearance at the moment when the discharge opening 5c of the lubricating oil path 5b of the crankpin 5 communicates with the crush relief 70 is small, and the oil flow F2 does not become too strong. Moreover, a frictional loss does not become great because turbulent flow is not easily generated even if the oil flow F2 is formed.

According to the present invention, the axial groove 71 is formed on the slide surface 7 within a region apart from the circumferentially central portion C of the half bearing 31 or 32 toward the forward side in the rotation direction Z of the crankpin 5 by a circumferential angle (θ1) of 10° or more, and apart from the crush relief 70 on the forward side in the rotation direction Z of the crankpin 5 toward the circumferentially central portion C of the half bearing 31 or 32 by a circumferential angle (θ2) of 10° or more.

The axial groove 71 is formed within such a region because a frictional loss is less when the axial groove 71 is apart from the circumferentially central portion C of the half bearing 31 or 32 toward the forward side in the rotation direction Z of the shaft (crankpin 5) by a circumferential angle of 10° or more than when the axial groove 71 is formed on the slide surface 7 in a region of a circumferential angle of less than 10°. As shown in FIG. 6, the slide surface 7 in a region of a circumferential angle of less than 10° from the circumferentially central portion C of the half bearing 31 or 32 is subject to a maximum load from the journal portion 6. If the axial groove 71 is formed in this region, the pressure of oil between the slide surface 7 and the surface of the crankpin 5 decreases, the slide surface 7 and the surface of the crankpin 5 more easily contact each other, and a frictional loss becomes large.

Furthermore, according to the present invention, the axial groove 71 is apart from the crush relief 70 located on the forward side in the rotation direction Z of the crankpin 5 by a circumferential angle of 10° or more toward the circumferentially central portion C of the half bearing 31 or 32, and a frictional loss is therefore less. If the axial groove 71 is formed within a region of a circumferential angle of less than 10° from the crush relief 70 located on the forward side in the rotation direction Z of the crankpin 5 toward the circumferentially central portion C of the half bearing 31 or 32, the discharge opening 5c of the lubricating oil path 5b of the crankpin 5 can simultaneously communicate with the axial groove 71 and the crush relief 70. If such communication occurs, the oil in the axial groove 71 is drawn further from the discharge opening 5c via an internal space of the lubricating oil path 5b in the vicinity of the discharge opening 5c by the oil flow F2 flowing into the relief clearance and then flows into the relief clearance because the pressure of oil in the relief clearance is lower than the pressure of oil in the axial groove 71. Accordingly, the oil in the clearance between the slide surface 7 and the surface of the crankpin 5 around the axial groove 71 flows into the axial groove 71, the slide surface 7 adjacent to the axial groove 71 directly contacts the surface of the crankpin 5, and a frictional loss becomes large.

Moreover, when the axial groove 71 is apart from the crush relief 70 located on the forward side in the rotation direction of the crankpin 5 by a circumferential angle of 10° or more toward the circumferentially central portion C of the half bearing 31 or 32, foreign matters contained in the oil in the lubricating oil path 5b of the crankpin 5, if any, are not easily discharged into the axial groove 71, and it is therefore difficult for the foreign matters to be embedded or accumulated in the inner surface of the axial groove 71. This is because, as shown in FIG. 6, the clearance between the surface of the crankpin 5 and the slide surface 7 of the half bearing 31 or 32 is smaller on the sides closer to the circumferentially central portion C of the half bearing 31 or 32. That is, the clearance is larger as is becomes closer to a circumferential end side, but if the axial groove 71 is brought a circumferential angle of 10° or more apart from the crush relief 70 toward the circumferentially central portion C of the half bearing 31 or 32, the clearance between the slide surface 7 as well as the axial groove 71, and the surface of the crankpin 5 is narrow, and the foreign matters in the lubricating oil path 5b do not easily flow out into the axial groove 71. It is preferable that the axial groove 71 is apart from the crush relief 70 on the forward side in the rotation direction of the crankpin 5 by a circumferential angle of 10° or more toward the circumferentially central portion C of the half bearing 31 or 32 so that it becomes more difficult for the foreign matters contained in the oil in the lubricating oil path 5b of the crankpin 5 to flow out into the axial groove 71.

It should be noted that, in Embodiment 1, both bearings of the pair of half bearings 31 and 32 constituting the connecting rod bearing 3 are configured to have the axial grooves 71, one of the pair of half bearings constituting a connecting rod bearing may be the half bearing 31 or 32 according to the present invention, and the other may be a conventional half bearing having no axial groove 71.

Embodiment 2

Figure 9:
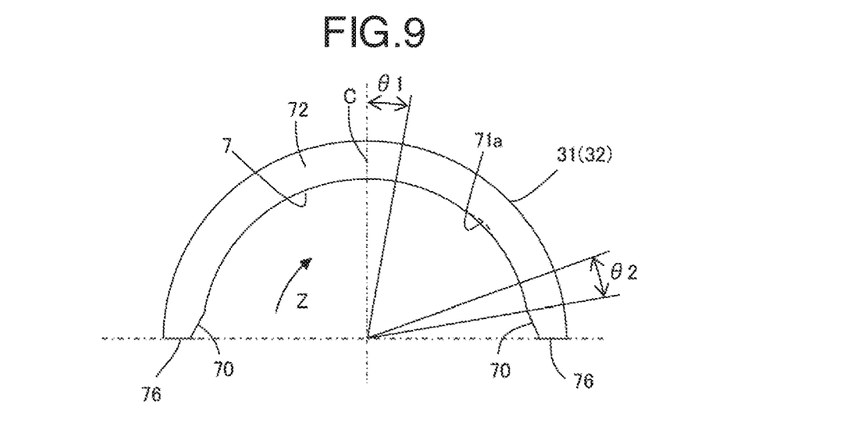
FIG. 9 is a view in which a half bearing of a connecting rod bearing according to a second embodiment of the present invention is seen from an axial direction.
Figure 10:
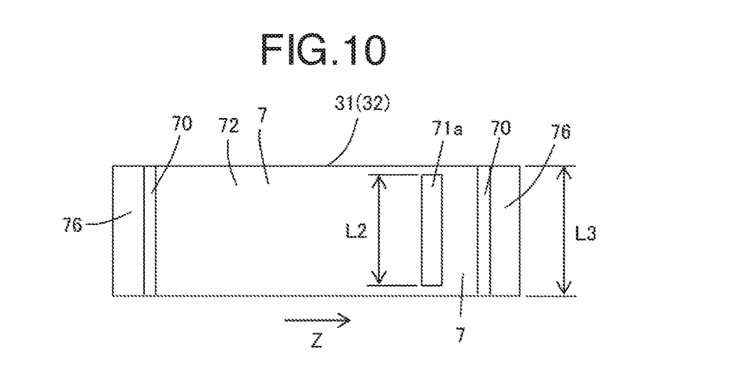
FIG. 10 is a plan view in which the half bearing shown in FIG. 9 is seen from a slide surface side.

As shown in FIG. 9 and FIG. 10, differently from the half bearing according to Embodiment 1, an axial groove 71a according to Embodiment 2 is formed so as not to open at an axial end of the half bearing 31 or 32. The other configurations according to Embodiment 2 are the same as the configurations of the half bearings 31 and 32 according to Embodiment 1.

The axial groove 71a is formed so that the center of an axial length L2 corresponds to the center of an axial length L3 of the half bearing 31 or 32.

It is preferable that the axial groove 71a is formed so that the axial length L2 is 70 to 95% of the axial length L3 of the half bearing 31 or 32.

Advantageous Effects

The present embodiment has advantageous effects similar to those of Embodiment 1. Moreover, the axial groove 71a does not open at either axial end of the half bearing 31 or 32. Therefore, it is more difficult for oil in the axial groove 71a to flow outside the bearing than in Embodiment 1.

It should be noted that the axial groove 71a may be formed so as to open at one axial end of the half bearing 31 or 32 and not to open at the other end.

Embodiment 3

Figure 11:
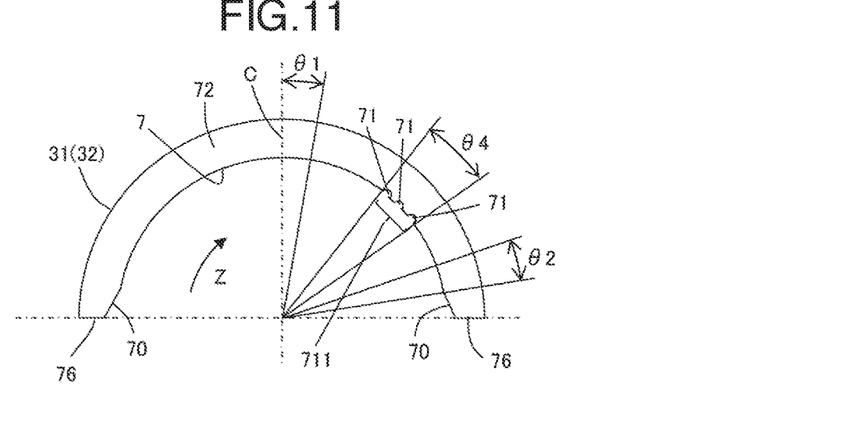
FIG. 11 is a view in which a half bearing of a connecting rod bearing according to a third embodiment of the present invention is seen from an axial direction.
Figure 12:
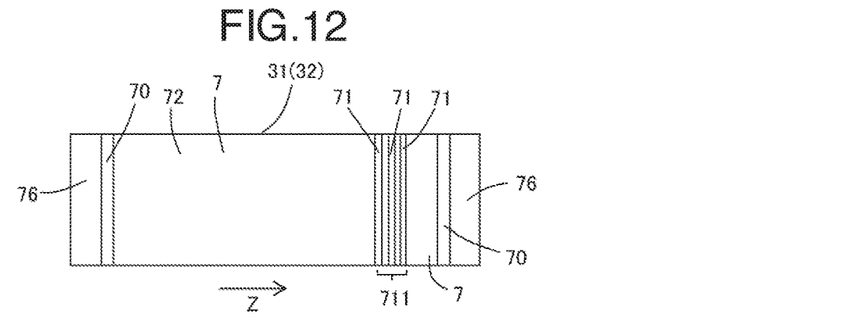
FIG. 12 is a plan view in which the half bearing shown in FIG. 11 is seen from a slide surface side.

As shown in FIG. 11 and FIG. 12, differently from the half bearings according to Embodiments 1 and 2, a half bearing 31 or 32 according to Embodiment 3 has a plurality of (three) axial grooves 71 on the slide surface 7 of the main cylindrical portion 72 between the circumferentially central portion C of the half bearing 31 or 32 and the crush relief 70 located on the forward side in the rotation direction of the crankpin 5.

These axial grooves 71 are also formed on the slide surface 7 in a region apart from the circumferentially central portion C of the half bearing 31 or 32 by a circumferential angle (θ1) of 10° or more, and apart from the crush relief 70 located on the forward side in the rotation direction of the crankpin 5 by a circumferential angle (θ2) of 10° or more toward the circumferentially central portion C.

The other configurations according to Embodiment 3 are the same as those of the half bearing 31, 32 according to Embodiment 1.

When the present invention is applied to a connecting rod bearing for a crankshaft of an internal combustion engine of a general passenger vehicle, that is, a connecting rod bearing for a crankshaft in which the diameter of a crankpin 5 is approximately 25 mm to 75 mm, the plurality of axial grooves 71 are preferably arranged to be separated from each other by 0.5 to 2 mm in the circumferential direction on the slide surface 7 of the half bearing 31 or 32. Moreover, the plurality of axial grooves 71 preferably have the same circumferential length L1 and the same depth D1.

Furthermore, the circumferential length of an axial groove formed region 711 on the slide surface 7 composed of the plurality of axial grooves 71 and slide surfaces between the axial grooves 71 is preferably a length equivalent to a circumferential angle (θ4) of 5 to 35° on the slide surface 7 of the half bearing 31 or 32.

In the present embodiment, the half bearing 31 or 32 has three axial grooves 71, but without being limited thereto, may have two, or four or more axial grooves 71.

Moreover, the plurality of axial grooves 71 do not need to open at both axial ends of the half bearing 31 or 32, as in Embodiment 2.

Advantageous Effects

The present embodiment has advantageous effects similar to those of Embodiment 1. Moreover, a slide surface 7 is provided between the plurality of axial grooves 71. Therefore, the present embodiment has the ability to bear the crankpin 5 by the slide surface even in the region (axial groove formed region) where the plurality of axial grooves 71 are formed.

It should be noted that, in Embodiments 1 to 3, an axial groove similar to the axial groove 71 may also be formed on the slide surface 7 between the circumferentially central portion C of the half bearing 31 or 32 and the crush relief 70 located on the backward side in the rotation direction of the crankpin 5 so that the half bearing 31 or 32 is shaped symmetrically with respect to the circumferentially central portion C, as illustrated in FIGS. 16-19.

By employing such a symmetrical shape, wrong mounting of the half bearing 31 or 32 in the connecting rod 2 can be prevented.

The half bearings constituting the connecting rod bearing according to the present invention described above may have an oil hole penetrating from the slide surface to the outer peripheral surface, and a partial groove extending in the circumferential direction on the slide surface. However, it is preferable that the oil hole and the partial groove are formed at such positions as to avoid the axial groove on the slide surface of the half bearing (namely, the oil hole and the partial groove do not communicate with the axial groove).

The invention claimed is:

1. A connecting rod bearing for rotatably supporting a crankpin of a crankshaft of an internal combustion engine, the crankpin comprising a cylindrical barrel portion, a lubricating oil path extending through the cylindrical barrel portion, and at least one discharge opening of the lubricating oil path formed on an outer peripheral surface of the cylindrical barrel portion,
wherein the connecting rod bearing comprises a pair of half bearings which are combined with each other to form a cylindrical shape, each of the half bearings has a main cylindrical portion including a circumferentially central portion of the half bearing, the main cylindrical portion comprises a slide surface on a radially inner side thereof, and each of the half bearings further comprises a crush relief formed on one end portion and another crush relief formed on the other end portion of the slide surface in a circumferential direction of the slide surface wherein a wall thickness at the crush relief is thinner than a wall thickness of the main cylindrical portion, and
wherein at least one of the pair of half bearings comprises an axial groove extending in an axial direction of the connecting rod bearing on the slide surface between the circumferentially central portion and the crush relief located on a forward side in a rotation direction of the crankpin and having a groove surface exposed to an inner side in a radial direction of the half bearing, and the axial groove is apart from the circumferentially central portion by a circumferential angle of 10° or more toward the forward side in the rotation direction, and apart from the crush relief located on the forward side in the rotation direction of the crankpin by a circumferential angle of 10° or more.

2. The connecting rod bearing according to claim 1, wherein a depth (D1) of the axial groove measured in a radial direction from the slide surface is 0.5 to 30 μm.

3. The connecting rod bearing according to claim 1, wherein the axial groove has a circumferential length corresponding to a circumferential angle (θ3) of 1 to 35°.

4. The connecting rod bearing according to claim 1, wherein the axial groove opens at axial ends of the half bearing.

5. The connecting rod bearing according to claim 1, wherein the axial groove does not open at axial ends of the half bearing.

6. The connecting rod bearing according to claim 1, wherein said at least one half bearing comprises a further axial groove formed on the slide surface between the circumferentially central portion and the crush relief on a backward side in the rotation direction of the crankpin so as to be symmetrical to said axial groove with respect to the circumferentially central portion.

7. The connecting rod bearing according to claim 1, wherein said at least one half bearing comprises a plurality of said axial grooves which are formed within a circumferential range of a circumferential angle (θ4) of 5 to 35°.

8. The connecting rod bearing according to claim 7, wherein said at least one half bearing comprises a further plurality of axial grooves formed on the slide surface between the circumferentially central portion and the crush relief on a backward side in the rotation direction of the crankpin so as to be symmetrical to said axial grooves with respect to the circumferentially central portion.

* * * * *